Sept. 14, 1965 F. T. SPERA 3,206,716

PLUG-IN ELECTRICAL COMPONENT

Filed Aug. 29, 1962 2 Sheets-Sheet 1

INVENTOR.
FRANK T. SPERA
BY
F. D. Rogers
ATTORNEY

Sept. 14, 1965 F. T. SPERA 3,206,716

PLUG-IN ELECTRICAL COMPONENT

Filed Aug. 29, 1962 2 Sheets-Sheet 2

INVENTOR.
FRANK T. SPERA

BY

F. D. Prager

ATTORNEY

United States Patent Office 3,206,716
Patented Sept. 14, 1965

3,206,716
PLUG-IN ELECTRICAL COMPONENT

Frank T. Spera, Philadelphia, Pa., assignor to Philco Corporation, Philadelphia, Pa., a corporation of Delaware Filed Aug. 29, 1962, Ser. No. 220,215
1 Claim. (Cl. 339—193)

Figure 1:
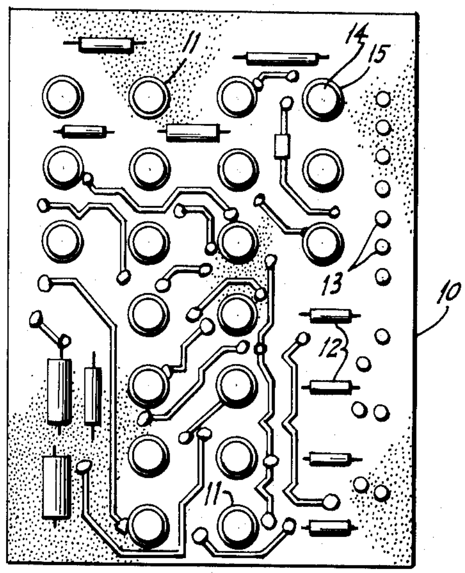

This invention relates to components of electrical circuits and particularly to so called "micrologic" components for insertion in "printed circuitry." A component of this kind has a system of minute electrode areas, disposed in the interior of a small housing, and a system of fine "lead wires" for connecting the various parts of such areas to outside circuits. The lead wires of a component usually have sections extending through, and hermetically sealed into, a glass bead or closure for the housing, also known as the stem of the component. The outer end portions of these numerous leads must be connected with external circuits.

It has been usual, but has also been a source of difficulty, removably to insert these outer wire ends into sockets, correspondingly arranged on a circuit board. Considerable difficulty was caused by the presence of many fine lead wires on a component. They were all too easily bent and put in disorder, especially when in the progress of miniaturization, complex micrologic systems with numerous leads were incorporated in a single component. Attempts have been made to overcome such problems by the use of an insulating holder forming part of a component, outside the stem, and holding outer portions of the lead wires for proper insertion in the socket portions of the circuit board. Such a construction, arranged for a transistor, is shown in Patent 2,881,405 of S. L. Yarbrough, owned by the assignee hereof. The present invention may, in some respects, be considered as a further development in the field of the invention of Yarbrough.

Wire holders of this former kind were generally useful when the component had only a very few lead wires; however, especially when large numbers of leads were involved it became difficult to expose sufficient wire surface area for contact. On the other hand, when adequate contact was insured the wires were not very positively held.

The present invention or improvement overcomes these latter difficulties by using a reversed and modified arrangement of elements. Heretofore, as noted, the component included lead wires and the circuit board had sockets or apertures for insertion of such wires. The new arrangement, by contrast, incorporates socket members as inserts in a plastic holder which forms part of the insertable component. It incorporates plug type connectors in the component support structure.

The rearranged unit is a distinct improvement over the former arrangement since the danger of bending the plugs has been minimized by their new arrangement. The reason lies in the fact that the individually insertable components must be moved around and shaken, by vibrators and the like, to orient them for insertion, while by contrast, connector systems installed on a circuit board can remain stationary relative to one another in the insertion process. Thus the invention reduces the dangers and improves the results of an insertion process applied to microcomponents, by reversing the former locations of the minute sockets with those of the corresponding plugs, while modifying the metal structures formerly associated with the small plastic holders.

Figure 2:
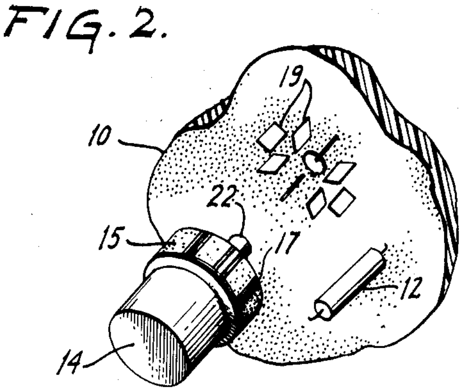
Figures 3, 4:
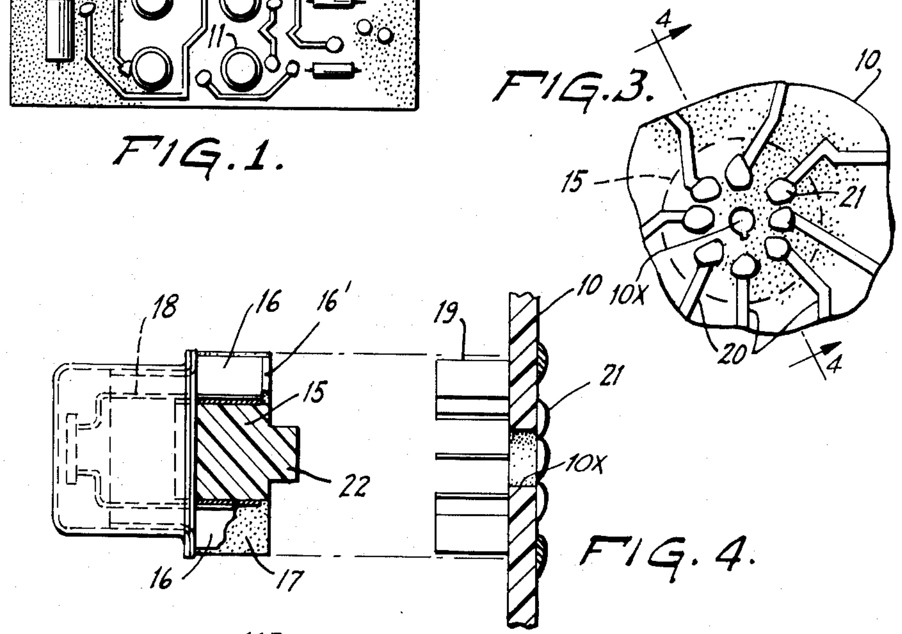

A preferred embodiment of the new structure is shown in the drawing appended hereto, wherein:

FIGURE 1 is a plan view of a printed circuit board with micrologic components connected thereto by means comprising this invention; FIGURE 2 is a perspective view of a detail from FIGURE 1, showing one of the micrologic components in process of being removed from or inserted on the board; FIGURE 3 is a rear view of the detail of FIGURE 2; and FIGURE 4 is a section taken along line 4—4 in FIGURE 3.

Figure 4A:
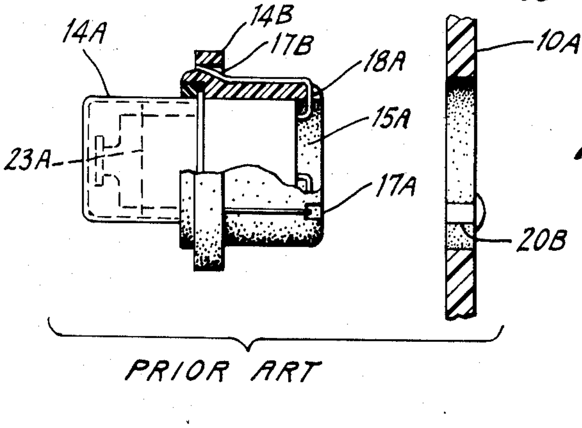
PRIOR ART FIG. 4A.

FIGURE 4A is a view generally similar to FIGURE 4 but showing a structure arranged in accordance with the above-mentioned Yarbrough principle, not claimed herein.

Figure 5:
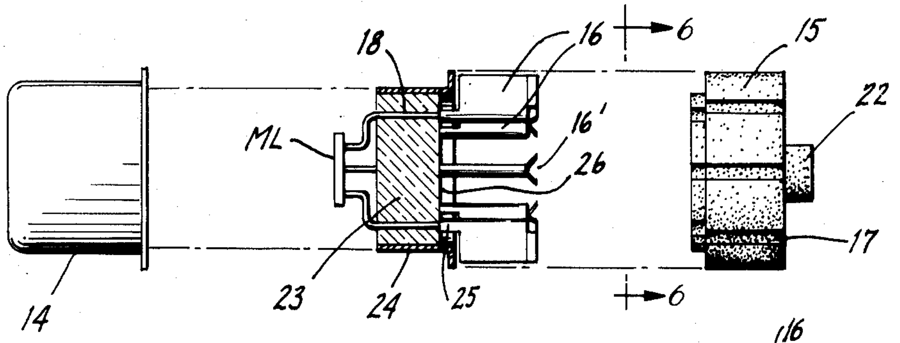
Figure 6:
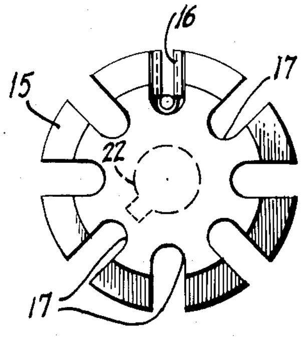
Figure 7:
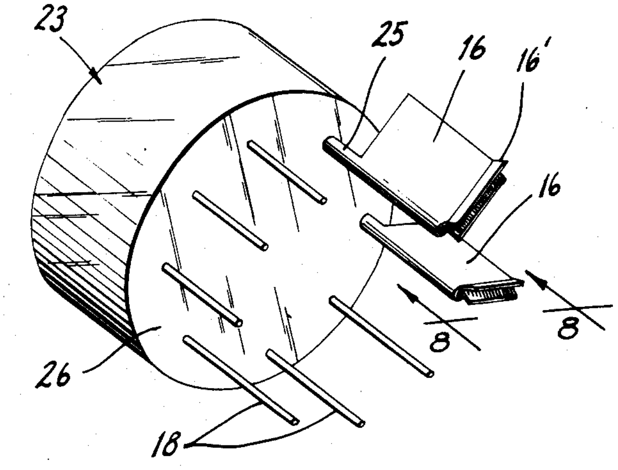
Figure 8:
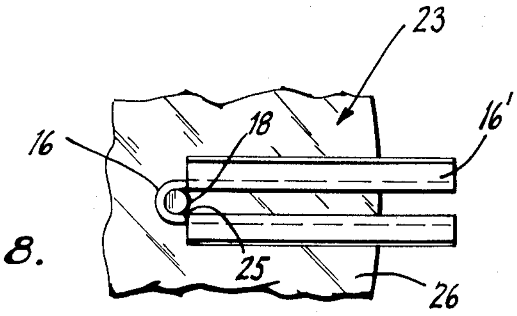

FIGURE 5 is a further view generally similar to FIGURE 4 but showing the new component of that figure in exploded form; FIGURE 6 is a somewhat larger end view of an element (15) of the component of FIGURE 5, viewed from the left as oriented in that figure; FIGURE 7 is an additionally enlarged, fragmentary representation of another element (23 etc.) of FIGURE 5, shown in perspective view, seen from the right as oriented in that figure; and FIGURE 8 is a still more enlarged view, taken along line 8—8 in FIGURE 7.

FIGURE 1 shows a circuit board 10 carrying a series of the new miniature component structures 11 along with other components 12, 13. Each of the new structures comprises for instance a micrologic housing 14 and a lead holder or collar 15 thereon. Detailed description of the micrologic device in this housing (schematically shown as element ML of FIGURE 5) is believed to be unnecessary at this point, it being known that such a device may comprise for instance a semiconductor structure with a series of electrode regions, whereby the element may provide a complete switching unit or circuit, for instance a computer "gate," or "flip-flop," or the like. It is further to be understood that the connector arrangement of this invention is applicable to lead systems of other complex microcomponents, such as miniature thermionic tubes. Basically, it comprises three component elements, that is (I) housing or hat 14, (II) micrologic element ML with support 23 and attachments thereof, and (III) lead holder or collar means 15, in addition to the panel structure or circuit board 10 and its attachments.

As shown in FIGURES 2 to 7 collar 15 holds a series of elongate metallic, clip-like elements or socket members 16. These socket members are substantially entirely embedded in grooves 17, formed in the resinous plastic material of said collar or holder, and each socket element is secured to, and thus forms an extension of, the outer end of a lead wire which in turn is rigidly attached to the micrologic element. Some of these wires are schematically shown at 18; they extend in general parallelism through and from support 23 of the micrologic element. Correspondingly registered blade-like contact members or plugs 19, shown as flat plates or spades, are disposed in upstanding relation on circuit board 10 and are secured to printed circuitry 20, for instance by solder spots 21, FIGURE 3. Thus it will be seen that in assembled condition of the new component structure, as illustrated in FIGURES 2 and 4, lead holder 15 embeds and holds sockets 16 of micrologic leads 18. When further assembled with circuit board 10, as illustrated in FIGURES 1 and 3, the new component structure engages plugs 19 of said circuit board, by means of the so-embedded sockets 16.

As additionally shown by FIGURES 2 and 3, a keyhole aperture 10X is provided in board 10, through which a component-orienting post 22 of the holder can extend. Suitable orientation is thus provided between the circuit board and each component stem support 23, as the lead wires and their sockets extend from the stem support and through the holder in straight lines parallel to the orienting post.

The invention has been illustrated as providing a series of eight sockets and plugs per component. This number can be changed; it is possible for instance to provide a dozen or larger numbers of leads as part of one component arranged according to this invention. The invention is also usable as applied to a component having a somewhat smaller number of leads. It will be understood that the invention applies only to installations wherein plug-in connection is allowed or desired; the improvement is not concerned for instance with those devices wherein end portions of component lead wires must be soldered directly to printed circuitry.

The way in which the plugs and sockets are combined with other elements in accordance with the invention can best be described in connection with FIGURES 4 to 8. Each socket element 16, of which only one is shown in FIGURE 6, is illustrated as a folded, double blade-like sheet metal structure lying in and held by a matching groove 17 in the generally cylindrical holder 15, said grooves and sockets extending in directions parallel to the axis of this holder and the sockets having flared outer ends 16' for reception of plugs 19 between the confronting and resiliently displaceable socket surfaces ending in these outer ends; also see FIGURE 7. As appears best from FIGURES 5, 6 and 8, a bent or folded portion of each socket member is secured to an outer lead wire end portion. Each of these lead wire end portions forms part of one of the thin lead wires 18, which extend in generally known fashion from micrologic unit ML through the glass support 23 in eyelet 24 of housing 14. Each outer lead wire end portion then extends into and through a socket clip 16, which is wrapped around the same and secured thereto for instance by a weld joint 25 formed in the direct vicinity of the exposed surface 26 of glass support 23; also see FIGURES 7 and 8 for these details of the metallic socket clips.

It will thus be seen that holder 15 and sockets 16 therein, as arranged in accordance with the invention, jointly constitute a novel type of outer extension of the element, support and lead system ML, 18, 23. There is definite advantage in using this kind of extension as compared with using merely a homogeneous component which utilizes a single electrically insulating material, i.e. either glass or resinous plastic material in lieu of the two portions 23, 15. In the support unit, hermetic sealing of glass 23 and wire metal 18 is required; experience indicates that such a unit cannot, for this reason, contain the numerous relatively large sockets 16, if the entire unit shall be made as small as is desired. A certain irreducible spacing between glass-sealed metal portions must be provided if the glass-metal unit shall be hermetically tight. The plastic holder 15, by contrast, serves only to hold, not to seal certain metal parts; this holder 15 therefore requires no such spacing of metal parts as is needed in the glass support 23. Holder or collar 15 can thus provide support for relatively large sockets 16 more readily than could the glass support.

Further advantages, gained by the new arrangement, can best be explained by comparing FIGURE 4, showing the new improvement, with FIGURE 4A wherein the corresponding assembly, according to Yarbrough, is shown. In this prior art arrangement a small number of lead wires such as the three leads 18A of a transistor unit 14A were effectively held, and at the same time exposed for contact, by the simple expedient of extending such leads from glass stem 23A through a hollow cylindrical holder or sleeve 15A and then through small notches 17A in the free edge of this holder or sleeve, where the leads were folded backwardly; they were then extended along the outside of the holder or sleeve to a flange 14B of this holder or sleeve, wherein apertures 17B were formed, each to hold the end of one lead wire.

By means of this arrangement proper contact could be made with a few suitably oriented and dimensioned conductor strips 20A on the printed board 10A, even in the event that pursuant to vibrating or shaking of such components, in the insertion process, one or the other lead wire extending over the exterior of the holder was slightly dislodged or misoriented. For such contacting, some suitable socket and contact structure was provided by board 10A; in some cases the was a more or less elaborate socket structure with metal inserts and insulating holders, fastened to the printed board, while in other cases the sockets of the board simply comprised apertures piercing the board and presenting printed circuit terminals 20A.

Major portions of the holder circumference were available for each lead wire 18A when the prior art structure used only two or three leads per component. Such simple construction is no longer successful with appreciably larger numbers of component lead wires. Larger numbers of notches and holder apertures 17A, 17B would be required, and while room might be found or provided for these, the arrangement would become less effective because of the closer proximity of wires to one another and the greater danger of confusion and improper contact thereof, pursuant to the component vibration which occurs in the insertion process.

While only a single embodiment of the invention has been described, the details thereof are not to be construed as limitative of the invention. The invention contemplates such variations and modifications as come within the scope of the appended claim.

I claim:

A plug-in structure for a series of thin metallic lead wires of a miniature component, comprising:

a support for said component, consisting of electrically insulating material, through which said lead wires extend and wherefrom they slightly project as a series of mutually parallel wire ends;

an electrically insulating holder constituting an extension of said support and having a series of slots distributed over surface portions of the holder, one slot for and in line with each of said wire ends;

and a series of metallic members consisting of material folded into a doubled sheet approximately as thin as said lead wires, each member being formed as a socket extending in a plane parallel to said wire ends, one such member being provided for each of said wire ends, being secured and connected thereto, and extending therefrom through but substantially not beyond the holder into one of said slots and being substantially embedded therein, each said member also having a flared opening adjacent a surface portion of the holder for engagement with a plug element upstanding from a support and circuit structure.

References Cited by the Examiner

UNITED STATES PATENTS

| | | | |
|---|---|---|---|
| 2,204,408 | 6/40 | Folsom | 339—191 X |
| 2,481,027 | 9/49 | Lawrence | 339—192 X |
| 2,522,907 | 9/50 | Streb | 339—190 X |
| 2,814,024 | 11/57 | Narozny | 339—193 |
| 2,904,772 | 9/59 | Artz | 339—17 X |
| 3,031,738 | 5/62 | Paulovitz | 339—17 X |
| 3,095,524 | 6/63 | Leonard et al. | 339—198 |
| 3,106,435 | 10/63 | Yopp | 339—176 |

FOREIGN PATENTS

| | | |
|---|---|---|
| 765,855 | 3/34 | France. |

JOSEPH D. SEERS, *Primary Examiner.*